C. HOWLAND.
DUMP WAGON.
APPLICATION FILED NOV. 9, 1910.
990,876.
Patented May 2, 1911.
2 SHEETS—SHEET 2.
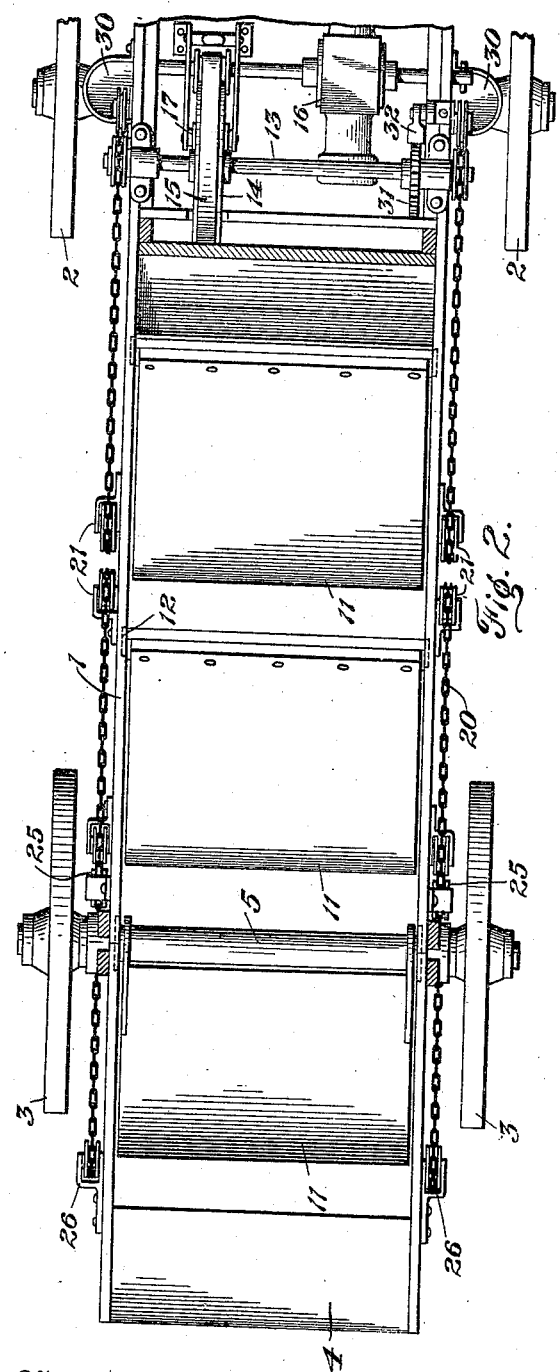
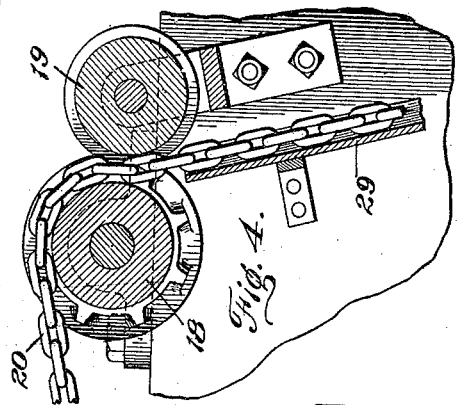
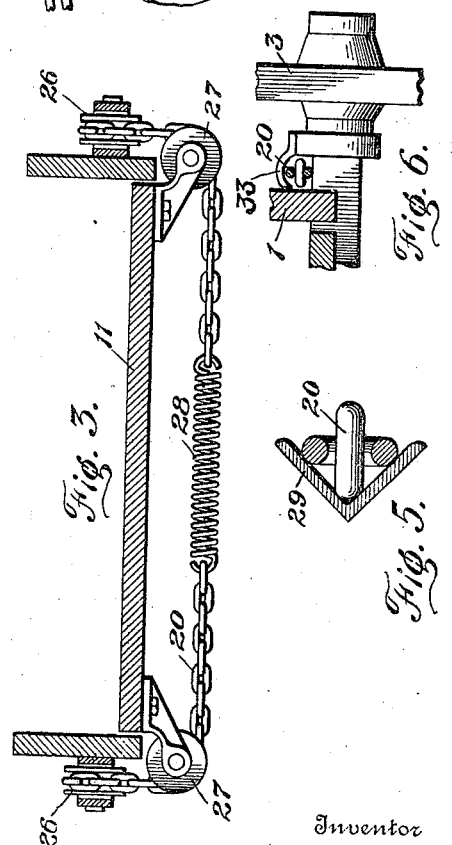
Witnesses
Chas. W. Stauffiger
A. M. Dorr
Inventor
CHARLES HOWLAND.
By
Attorneys

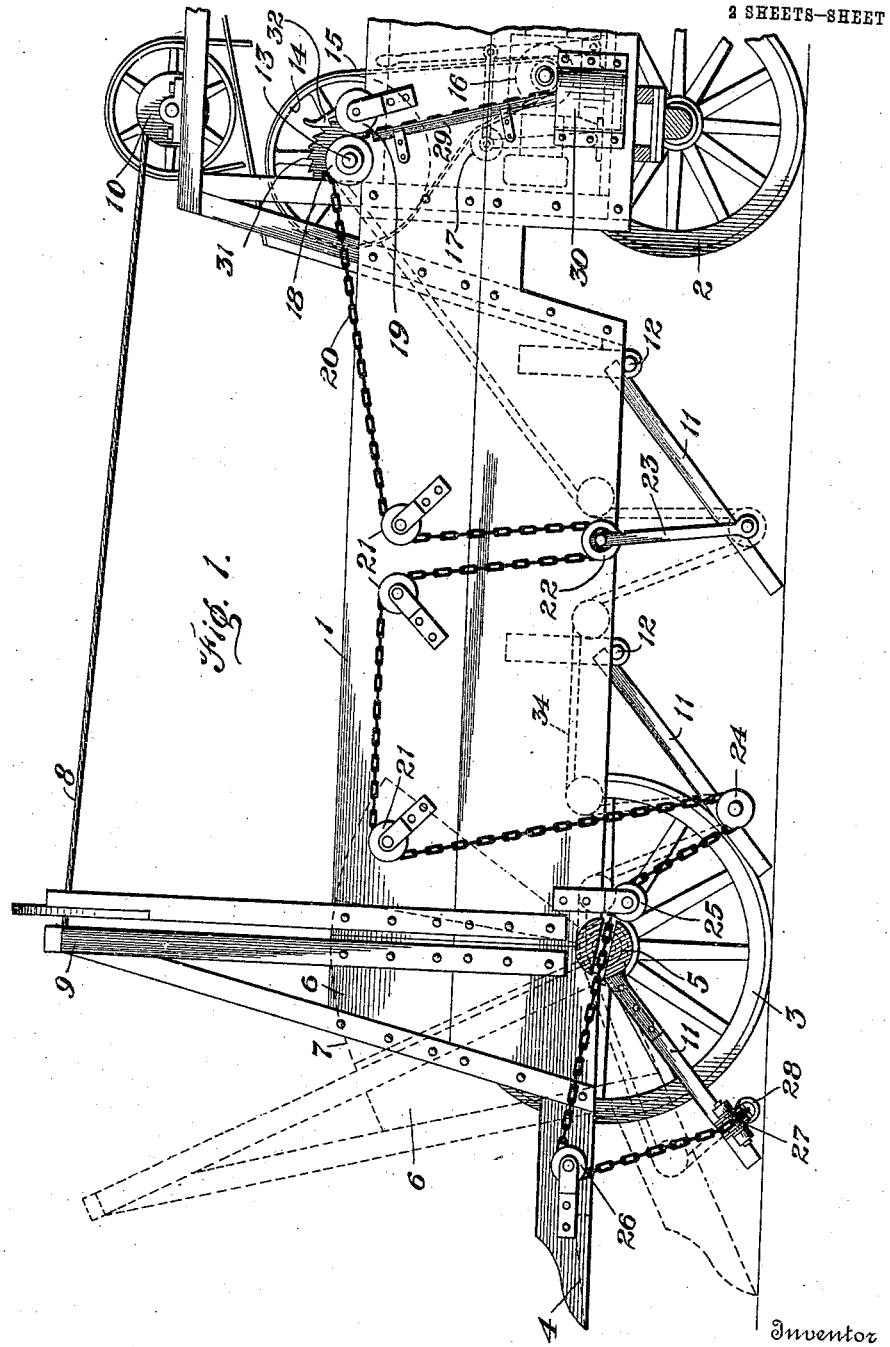

UNITED STATES PATENT OFFICE.

CHARLES HOWLAND, OF PONTIAC, MICHIGAN.

DUMP-WAGON.

990,876.

Specification of Letters Patent. Patented May 2, 1911.

Application filed November 9, 1910. Serial No. 591,466.

*To all whom it may concern:*

Be it known that I, CHARLES HOWLAND, a citizen of the United States of America, residing at Pontiac, in the county of Oakland and State of Michigan, have invented certain new and useful Improvements in Dump-Wagons, of which the following is a specification, reference being had therein to the accompanying drawings.

This invention relates to dump wagons and more particularly to an arrangement thereof whereby the unloading of the cart is accomplished with little difficulty and whereby the box is closed tightly after being emptied.

One feature of the invention is the adaptability of the device to wagons of the self-loading type or of the type adapted for use with mechanical loaders.

The invention consists in the matters hereinafter set forth and more particularly pointed out in the appended claims.

In the drawings, Figure 1 is a view in side elevation, partially broken away and partly in section, of a wagon embodying features of the invention; Fig. 2 is a plan view thereof partly in section and partially broken away. Fig. 3 is a view in detail of equalizer and chains; Fig. 4 is a view in detail of a chain pulley and guide; Fig. 5 is a view in detail in cross section of a guide and chain, and Fig. 6 is a view in detail of an axle fitting for a chain.

As herein indicated, a wagon box having sides 1 is mounted on forward bearing wheels 2 and rear bearing wheels 3. As herein shown, the box has a rear section with a platform indicated at 4 pivoted on the rear axle 5 with side aprons 6 abutting the sides 1 of the box when the platform is in normal horizontal position and having extensions 7 which close the gap between the wings and the ends of the sides when the platform is lowered. The latter is controlled by any suitable means as for example, a flexible connection indicated at 8 and secured at one end to an extension or upright 9 on the platform with its forward portion fastened around a windlass or drum 10 near the driver's seat.

A series of transverse sections 11 form the bottom of the box, their forward ends being pivotally secured thereto by any preferred means indicated at 12. A shaft 13 is journaled across the forward portion of the box near the driver's seat and is rotated by means of a pulley 14 and belt 15 by a motor 16 mounted on the front of the box, an idler 17 being used to tighten the belt. Or if desired, other convenient operative connections between the shaft and motor may be used. A chain pulley 18 is secured on each end of the shaft with a guard wheel 19 that confines a chain 20 extending over the pulley and over guide sheaves 21 journaled on the box sides 1. The free end of the forward one of the sections 11 is supported by a pulley 22 mounted thereon and lying in a loop or bight of the chain 20. As a matter of convenience the pulley 22 may be journaled on the end of a strap hanger 23 pivoted at its lower end to the section, so that dirt traveling down the section when the latter is depressed does not work into the chain. If the links are omitted the chain is disposed as shown by the dotted lines 34. The chain passes around another guide pulley 24 on the rear section of the main body and thence over a sheave 25 and through an aperture in the axle 5 or under a fitting 33 on the axle to a rear guide block 26, its end portion being drawn around a sheave 27 and secured to a transversely disposed equalizing spring 28 under the free end of the bottom section which constitutes a part of the extension platform 4. The forward portion of the chain which depends from the pulley 18 travels along a suitably designed guide chute 29 into a casing 30. A ratchet wheel 31 with dog 32 holds the shaft 13 from allowing the chains to run out when the sections are drawn up and the box is closed.

In operation, a box that is loaded is readily emptied by releasing the pulley shaft and allowing the sections to fall, either freely or through operation of the motor so as to allow the use of the wagon for grading purposes. By reversing the motor the sections are readily drawn to place and as the chains on the opposite sides of the box are connected by the equalizing spring any stretching or inequality in the chain is compensated for. When the wagon is used with a mechanical loader, that is, is provided with a rear extension that may be dropped to the ground for drawing a scraper or the like up on to the box, the passing of the chain through the rear axle or, similarly, through or close to the pivotal axis of the rear extension allows the latter to be tilted as desired without affecting the length of the chain as the rear stretch of the latter is radially disposed. The motor, of course, may be used to actuate a drum for hauling the scraper or other mechanical loader when the wagon is stationary. The forward portions of the chain are prevented from entangling by the use of the guide chutes under the chain pulleys so that the chains run freely at all times while their slack or unused portions are housed from contact with the load in the box.

I claim as my invention:—

1. In a dump wagon, a box, bottom sections each pivoted to swing on an axis transverse to the box, a tiltable rear extension to the box, a bottom section therefor pivoted to swing on an axis parallel to the axes of the other sections, flexible members each on a side of the box supporting the sections of the box and of the extension and coacting to swing the sections simultaneously, and means for operating the flexible members.

2. In a dump wagon, a box, bottom sections each pivoted to swing on an axis transverse to the box, a tiltable rear extension to the box, a bottom section therefor pivoted to swing on an axis parallel to the axes of the other sections, flexible members each on a side of the box supporting the sections of the box and of the extension and coacting to swing the sections simultaneously, means yieldingly connecting the rear ends of the flexible members, and means for operating the flexible members.

3. In a dump wagon, a box, a tiltable rear extension thereto, means for tilting the extension, bottom sections, in the box and extension pivoted to swing on axes transverse to the box, guide sheaves on the sides of the box, the extension and the free ends of the sections, flexible members each passing over the sheaves at one side of the box and sections and coacting to swing the sections simultaneously, a compensating member yieldingly connecting the rear ends of the flexible members, and means for operating the members simultaneously.

4. In a dump wagon, a box, bottom sections thereon pivoted to swing on axes, transverse to the box, guide sheaves on the box sides, guide sheaves secured to the free ends of the sections, a chain pulley at the forward end of each side of the box, chain guide chutes each leading from one of the pulleys into the forward portion of the box, chains whose forward unattached ends lie in the box, passing up the chutes, over the pulleys and box sheaves, and under the section sheaves, and means for driving the pulleys.

5. In a dump wagon a box, bottom sections thereon pivoted to swing on axes transverse to the box, guide sheaves on the box sides, guide sheaves secured to the free ends of the sections, a chain pulley at the forward end of each side of the box, chain guide chutes each leading from one of the pulleys into the forward portion of the box, chains whose forward unattached ends lie in the box, passing up the chutes over the pulleys and box sheaves and under the section sheaves, a compensating spring connecting the rear ends of the chains under the rear section, and means for driving the pulleys.

6. In a dump wagon, a box, bottom sections thereon pivoted to swing on axes transverse to the box, guide sheaves on the box sides, guide sheaves secured to the free end of each side of the box, chain guide chutes each leading from one of the pulleys into the forward portion of the box, chains whose forward unattached ends lie in the box, passing up the chutes over the pulleys and box sheaves and under the section sheaves, a rear extension pivoted to the back end of the box, a bottom section therein pivoted on an axis parallel to the axes of the box sections, and provided with guide apertures adjacent the axis of its center of motion, guide sheaves on the extension to which the chains lead from the apertures through which they pass, guide sheaves on the extension section under which the chains pass, and means for driving the pulleys.

7. In a dump wagon, a box, bottom sections thereon pivoted to swing on axes transverse to the box, guide sheaves on the box sides, guide sheaves secured to the free ends of the sections, a chain pulley at the forward end of each side of the box, chain guide chutes each leading from one of the pulleys into the forward portion of the box, chains whose forward unattached ends lie in the box, passing up the chutes over the pulleys and box sheaves and under the section sheaves, a rear extension pivoted to the back end of the box, a bottom section thereon pivoted on an axis parallel to the axes of the box sections, and provided with guide apertures adjacent the axis of its center of motion, guide sheaves on the extension to which the chains lead from the apertures through which they pass, guide sheaves on the extension section under which the chains pass, means for driving the pulleys, and means for tilting the extension.

8. In a dump wagon, a box, bottom sections thereon pivoted to swing on axes transverse to the box, guide sheaves on the box sides, guide sheaves secured to the free ends of the sections, a chain pulley at the forward end of the sections, a chain pulley at the forward end of each side of the box, chain guide chutes each leading from one of the pulleys into the forward portion of the box, chains whose forward unattached ends lie in the box passing up the chutes over the pulleys and box sheaves and under the section sheaves, a rear extension pivoted to the back end of the box, a bottom section thereon pivoted on an axis parallel to the axes of the box sections, and provided with guide apertures adjacent the axis of its center of motion, guide sheaves on the extension to which the chains lead from the apertures through which they pass, guide sheaves on the extension section under which the chains pass, a spring under the extension section connecting the chain ends, and means for driving the pulleys.

In testimony whereof I affix my signature in presence of two witnesses.

CHARLES HOWLAND.

Witnesses:
OTTO F. BARTHEL,
C. R. STICKNEY.

Copies of this patent may be obtained for five cents each, by addressing the "Commissioner of Patents, Washington, D. C."